United States Patent
Masuda et al.

(10) Patent No.: US 8,736,101 B2
(45) Date of Patent: May 27, 2014

(54) POWER SOURCE SYSTEM FOR ELECTRIC POWERED VEHICLE AND CONTROL METHOD THEREOF

(75) Inventors: Tomokazu Masuda, Kasugai (JP); Ryuichi Kamaga, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/519,644

(22) PCT Filed: Feb. 9, 2010

(86) PCT No.: PCT/JP2010/051868
§ 371 (c)(1),
(2), (4) Date: Jun. 28, 2012

(87) PCT Pub. No.: WO2011/099116
PCT Pub. Date: Aug. 18, 2011

(65) Prior Publication Data
US 2012/0299377 A1    Nov. 29, 2012

(51) Int. Cl.
*B60L 1/00*    (2006.01)
*B60L 3/00*    (2006.01)
*H02G 3/00*    (2006.01)

(52) U.S. Cl.
USPC ............................. 307/10.1; 307/9.1

(58) Field of Classification Search
USPC .................................... 307/9.1, 10.1
See application file for complete search history.

(56) References Cited

U.S. PATENT DOCUMENTS

| | | | |
|---|---|---|---|
| 6,507,506 B1 * | 1/2003 | Pinas et al. | 363/79 |
| 6,879,057 B1 * | 4/2005 | Pinas et al. | 307/10.1 |
| 2007/0252601 A1 * | 11/2007 | Satoh et al. | 324/431 |
| 2009/0039831 A1 * | 2/2009 | Ichikawa | 320/118 |
| 2010/0001523 A1 * | 1/2010 | Sato et al. | 290/31 |

FOREIGN PATENT DOCUMENTS

| | | |
|---|---|---|
| JP | A-7-111735 | 4/1995 |
| JP | A-2000-341801 | 12/2000 |
| JP | A-2006-197765 | 7/2006 |
| JP | A-2007-209168 | 8/2007 |
| JP | A-2008-195315 | 8/2008 |
| WO | WO 2009/011444 A1 | 1/2009 |

OTHER PUBLICATIONS

JP,2009-027774 English translation.*
International search report (PCT?JP2010/051868).*
International Search Report issued in International Patent Application No. PCT/JP2010/051868 dated Apr. 13, 2010.

* cited by examiner

*Primary Examiner* — Rexford Barnie
*Assistant Examiner* — Rasem Mourad
(74) *Attorney, Agent, or Firm* — Oliff PLC

(57) ABSTRACT

An electric powered vehicle is equipped with a main battery for storing electric power input to and output from a motor, and an auxiliary battery as a power source for an auxiliary system including a control system. A DC/DC converter converts an output voltage of the main battery to a level of an output voltage of the auxiliary battery. During operation, a BAT-ECU monitors states of charge of the main battery and the auxiliary battery and controls operation/stop of the DC/DC converter. When the electric powered vehicle is in a key-off state (running stop state), the BAT-ECU is intermittently operated, while an external charging system and a vehicle running system are stopped.

17 Claims, 7 Drawing Sheets

POWER SOURCE SYSTEM FOR ELECTRIC POWERED VEHICLE AND CONTROL METHOD THEREOF

TECHNICAL FIELD

The present invention relates to a power source system for an electric powered vehicle and to a method for controlling the same. More specifically, the present invention relates to auxiliary battery charging control in an electric powered vehicle equipped with a main power storage device (main battery) for supplying electric power to a traction motor and a sub power storage device (auxiliary battery) for supplying electric power to auxiliary machines including a controller.

BACKGROUND ART

Electric vehicles, hybrid vehicles, and fuel cell vehicles have been known as electric powered vehicles configured such that a traction motor generating vehicle driving power can be driven using electric power from a vehicle-mounted power storage device represented by a secondary battery. An electric powered vehicle is generally configured to have two types of power storage devices, that is, a high-voltage power storage device (main battery or high-voltage battery) used to supply electric power to a traction motor, and a low-voltage power storage device (auxiliary battery or low-voltage battery) used to supply electric power to auxiliary machines including a controller.

In such a configuration, when a remaining capacity of the high-voltage battery is reduced, the vehicle cannot run as a matter of course. Further, when voltage is reduced due to reduction in a remaining capacity of the low-voltage battery, the controller cannot be operated normally, and thereby there is a possibility that the vehicle cannot run even if the remaining capacity of the high-voltage battery is ensured. Therefore, it is necessary to fully manage the state of charge of the low-voltage battery, in addition to that of the high-voltage battery, and recover the remaining capacity thereof when charging is insufficient.

For example, Japanese Patent Laying-Open No. 2000-341801 (PTL 1) describes a power source device for an electric vehicle equipped with a low-voltage battery and a high-voltage battery, wherein when charging of the low-voltage battery is insufficient, the low-voltage battery is charged from the high-voltage battery through a DC/DC converter.

Further, Japanese Patent Laying-Open No. 7-111735 (PTL 2) describes that, if a remaining capacity of an auxiliary battery becomes insufficient during charging of a main battery when an electric vehicle is in a vehicle stop mode, an output voltage of a DC/DC converter is increased to increase the remaining capacity of the auxiliary battery.

Moreover, Japanese Patent Laying-Open No. 2008-195315 (PTL 3) describes a so-called plug-in hybrid vehicle configured such that a high-voltage battery (main battery) can be charged by a power source external to the vehicle. In addition, Japanese Patent Laying-Open No. 2007-209168 (PTL 4) describes that, when a main battery (main power storage device) is charged by a solar cell, a commercial power source, or the like in a plug-in hybrid vehicle, a battery ECU (Electronic Control Unit) for monitoring the state of the main battery is driven at prescribed intervals to minimize the frequency of activating the battery ECU.

In the configuration of PTL 4, an auxiliary battery can be charged by activating a DC/DC converter during charging of the main battery when the vehicle is in a stop mode. However, in PTL 4, a voltage level of the auxiliary battery is not monitored by the battery ECU, but is monitored by a charging ECU which is always activated during charging of the main battery. In addition, it is described that, if the voltage level of the auxiliary battery becomes lower than a preset threshold value, the charging ECU instructs activation of the DC/DC converter.

CITATION LIST

Patent Literature

PTL 1: Japanese Patent Laying-Open No. 2000-341801
PTL 2: Japanese Patent Laying-Open No. 7-111735
PTL 3: Japanese Patent Laying-Open No. 2008-195315
PTL 4: Japanese Patent Laying-Open No. 2007-209168

SUMMARY OF INVENTION

Technical Problem

In order to avoid a situation where, despite a sufficient remaining capacity of the main battery (main power storage device), the vehicle cannot run due to voltage reduction in the auxiliary battery (sub power storage device), it is necessary to perform control which monitors an output voltage (remaining capacity) of the auxiliary battery also when the vehicle is in a running stop state, and charges the auxiliary battery using electric power of the main battery if voltage reduction in the auxiliary battery occurs.

However, in the configuration in which the output voltage (remaining capacity) of the auxiliary battery is always monitored, there is a concern that, if vehicle running is stopped for a long time, stored electric power (remaining capacity) of the entire vehicle including the main battery is reduced through continuous power consumption in a control system, posing a problem on vehicle activation.

The present invention has been made to solve these problems, and provides a configuration of a power source system for ensuring normal vehicle activation performance by suppressing power consumption while an electric powered vehicle is in a running stop state and performing charging control of a sub power storage device as a power source for a control system.

Solution to Problem

According to the present invention, a power source system for an electric powered vehicle equipped with a motor generating vehicle driving power includes a main power storage device and a sub power storage device, a voltage converter, and a first controller. The main power storage device stores electric power input to and output from the motor. The sub power storage device has an output voltage lower than an output voltage of the main power storage device. The voltage converter is configured to convert the output voltage of the main power storage device to a level of the output voltage of the sub power storage device, and output the converted output voltage to the sub power storage device. The first controller is operated using electric power from the sub power storage device, for monitoring states of charge of the main power storage device and the sub power storage device and controlling operation and stop of the voltage converter. The first controller is configured such that, in a vehicle running state, the first controller is always operated, and always operates the voltage converter to maintain the output voltage of the sub power storage device at a target voltage, and when the electric powered vehicle is in a key-off state, the first controller is intermittently operated, and if the output voltage of the sub power storage device becomes lower than a prescribed voltage during operation, the first controller performs charging processing for the sub power storage device using the electric power of the main power storage device, by operating the voltage converter.

In a control method for a power source system for an electric powered vehicle according to the present invention, the power source system includes the main power storage device and the sub power storage device, the voltage converter, and the first controller described above. The control method includes the steps of: intermittently operating the first controller when the electric powered vehicle is in a key-off state; obtaining the output voltage of the sub power storage device during intermittent operation of the first controller; and, performing, if the obtained output voltage becomes lower than a prescribed voltage, charging processing for the sub power storage device using the electric power of the main power storage device, by operating the voltage converter.

Preferably, the power source system further includes a charging connector, a charger, and a second controller. The charging connector is provided for establishing electrical contact with an external power source external to the vehicle. The charger is configured to convert electric power from the external power source supplied to the charging connector, into charging power for the main power storage device. The second controller is configured to be operated using the electric power supplied from the sub power storage device, for controlling the charger to charge the main power storage device using the electric power from the external power source when a prescribed condition for external charging is satisfied and thereby transition from the key-off state to an external charging state is made. In the external charging state, the first controller is always operated, and always operates the voltage converter to maintain the output voltage of the sub power storage device at the target voltage.

More preferably, the first controller is configured such that, if the electric power from the external power source can be supplied when the output voltage of the sub power storage device becomes lower than the prescribed voltage during intermittent operation in the key-off state, the first controller performs the charging processing for the sub power storage device using the electric power from the external power source, by operating the voltage converter and requesting operation of the second controller and the charger. In particular, the first controller is configured such that, if the electric power from the external power source cannot be supplied when the output voltage of the sub power storage device becomes lower than the prescribed voltage during the intermittent operation in the key-off state, the first controller performs the charging processing for the sub power storage device using the electric power of the main power storage device, by operating the voltage converter.

Preferably, in the power source system further including the charging connector, the charger, and the second controller described above, the step of performing the charging processing further includes the steps of: determining whether or not the electric power from the external power source can be supplied; performing, if the electric power from the external power source can be supplied, the charging processing for the sub power storage device using the electric power from the external power source, by operating the voltage converter and requesting operation of the second controller and the charger; and, performing, if the electric power from the external power source cannot be supplied, the charging processing for the sub power storage device using the electric power of the main power storage device, by operating the voltage converter.

Preferably, the power source system further includes an auxiliary load configured to receive supply of operational electric power from the sub power storage device. The first controller is configured such that, if a voltage reduction amount in the sub power storage device and a discharge current of the sub power storage device are greater than prescribed levels even when the output voltage of the sub power storage device is higher than the prescribed voltage during intermittent operation in the key-off state, the first controller performs the charging processing for the sub power storage device using the electric power from the external power source or the electric power of the main power storage device. Alternatively, the control method further includes the step of instructing the charging processing for the sub power storage device, if a voltage reduction amount in the sub power storage device and a discharge current of the sub power storage device are greater than prescribed levels even when the obtained output voltage is higher than the prescribed voltage.

Preferably, the first controller is configured such that, if a remaining capacity of the main power storage device is lower than a prescribed level during the charging processing for the sub power storage device, the first controller does not perform the charging processing using the electric power of the main power storage device. Alternatively, the step of performing the charging processing has the step of not performing the charging processing using the electric power of the main power storage device, if a remaining capacity of the main power storage device is lower than a prescribed level.

More preferably, the first controller is configured such that, if the remaining capacity of the main power storage device is lower than the prescribed level and thus the first controller does not perform the charging processing, the first controller suspends subsequent intermittent operation and keeps stopping during the key-off state. Alternatively, the step of performing the charging processing further includes the step of suspending subsequent intermittent operation of the first controller and keeping stopping of the first controller during the key-off state, if the remaining capacity of the main power storage device is lower than the prescribed level and thus the charging processing is not performed.

Preferably, the first controller is configured such that, if the output voltage of the sub power storage device is higher than the prescribed voltage during intermittent operation in the key-off state, the first controller determines a degree of deterioration of the sub power storage device based on changes in the output voltage of the sub power storage device detected at each intermittent operation. Alternatively, the control method further includes the step of determining a degree of deterioration of the sub power storage device based on changes in the output voltage of the sub power storage device detected at each intermittent operation, if the obtained output voltage is higher than the prescribed voltage.

Preferably, the first controller is configured such that, during the intermittent operation in the key-off state, the first controller sets a cycle of the intermittent operation based on the determined degree of deterioration of the sub power storage device. Alternatively, the control method further includes the step of setting a cycle of the intermittent operation of the first controller based on the determined degree of deterioration of the sub power storage device.

Preferably, the power source system further includes a charging connector, a charger, a charging relay, a second controller, a main relay, a power control unit, and a third controller. The charging connector is provided for establishing electrical contact with an external power source external to the vehicle. The charger is configured to convert electric power from the external power source supplied to the charging connector, into charging power for the main power storage device. The charging relay controls connection and cut-off between the charger and the main power storage device. The second controller is configured to be operated using the electric power from the sub power storage device, for controlling the charger to charge the main power storage device by the external power source when a prescribed condition for external charging is satisfied and thereby transition from the key-off state to an external charging state is made. The main relay controls connection and cut-off between the main power storage device and a main power supply line. The power control unit is configured to control driving of the motor by power conversion between the main power supply line and the motor during the vehicle running state. The third controller is configured to be operated using the electric power from the sub power storage device, for controlling the power control unit to drive the motor in accordance with a running state during vehicle running. In the key-off state, the main relay and the charging relay are opened, and the second controller, the third controller, the charger, and the power control unit are stopped.

Advantageous Effects of Invention

According to the present invention, normal vehicle activation performance can be ensured by suppressing power consumption while the electric powered vehicle is in a running stop state and performing charging control of the sub power storage device as a power source for a control system.

DESCRIPTION OF EMBODIMENTS

Figure 1:
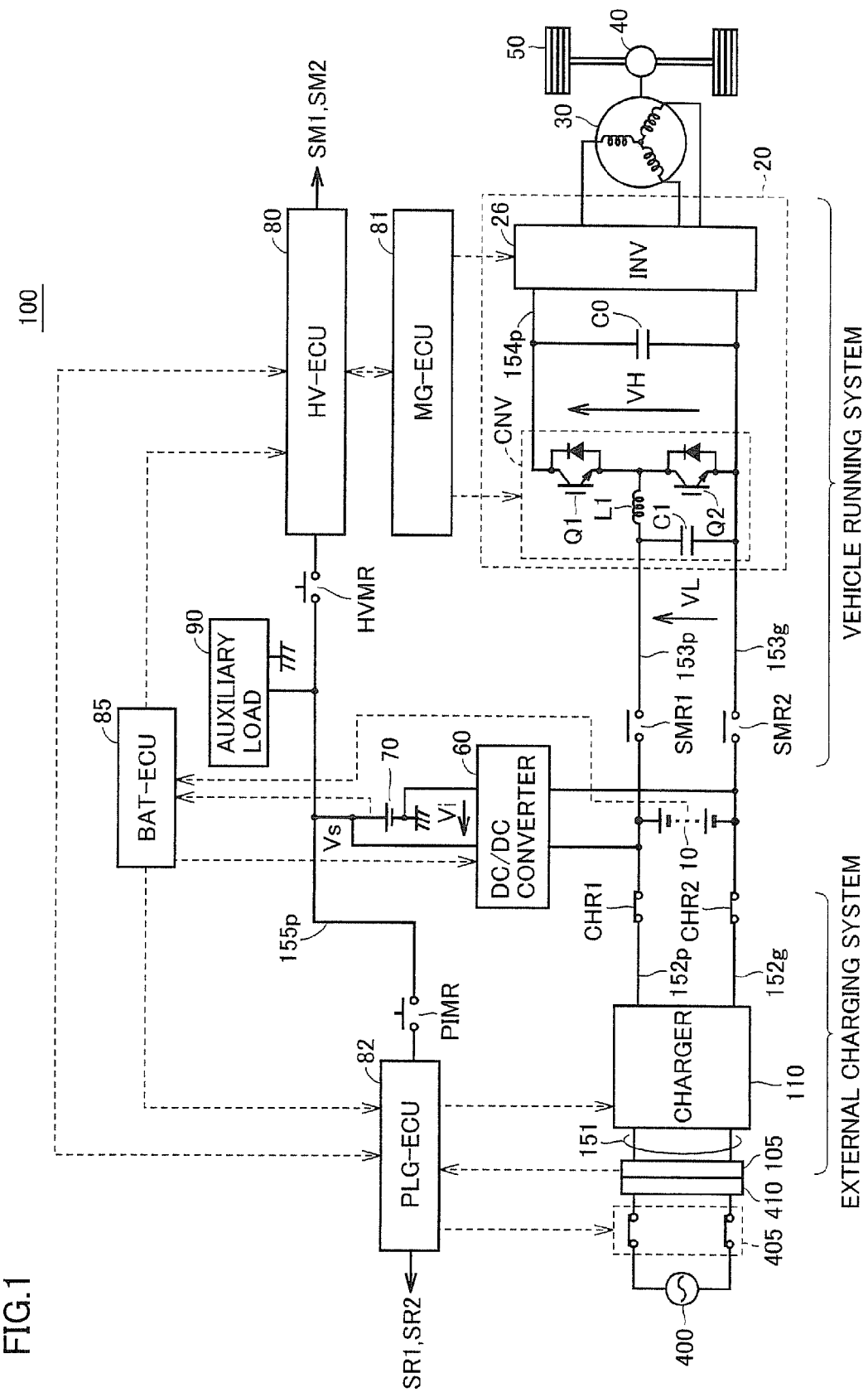
FIG. 1 is a block diagram showing a configuration of a power source system for an electric powered vehicle in accordance with an embodiment of the present invention.

In the following, an embodiment of the present invention will be described in detail with reference to the figures. In the following, the same or corresponding portions in the figures are denoted by the same reference characters and, basically, description thereof will not be repeated.

FIG. 1 is a block diagram showing a configuration of a power source system for an electric powered vehicle in accordance with an embodiment of the present invention.

Referring to FIG. 1, an electric powered vehicle 100 includes a main battery 10, a power control unit (PCU) 20, a motor generator 30, a power transmission gear 40, driving wheels 50, and a controller composed of a plurality of ECUs.

As the ECUs constituting the controller, FIG. 1 illustrates an HV-ECU 80 for controlling operation of electric powered vehicle 100 while the vehicle is running, an MG-ECU 81 for controlling operation of PCU 20, a PLG-ECU 82 for controlling external charging operation, and a BAT-ECU 85 for managing and controlling states of charge of main battery 10 and an auxiliary battery 70.

Each ECU is configured with an electric control unit including a CPU (Central Processing Unit) and a memory not shown, and configured to execute arithmetic processing using a value detected by each sensor, based on a map and a program stored in the memory. Alternatively, at least a part of ECU 80 may be configured to execute prescribed numerical/logical arithmetic processing by hardware such as an electronic circuit.

Main battery 10 corresponds to a "main power storage device", and is typically configured with a secondary battery such as a lithium ion battery or a nickel hydride battery. By way of example, main battery 10 has an output voltage of about 200 V. Alternatively, the main power storage device may be configured with an electric double layer capacitor, or by a combination of a secondary battery and a capacitor.

PCU 20 converts electric power stored in main battery 10 into electric power for controlling driving of motor generator 30. By way of example, motor generator 30 is configured with a permanent magnet-type three-phase electric motor, and PCU 20 is configured to include an inverter 26.

An output torque of motor generator 30 is transmitted through power transmission gear 40 configured with a reduction gear or a power split device to the driving wheels, whereby electric powered vehicle 100 runs. At the time of regenerative braking of electric powered vehicle 100, motor generator 30 can generate electric power by the rotational force of driving wheels 50. The generated electric power is converted by PCU 20 into charging power for main battery 10.

Further, in a hybrid vehicle equipped with an engine (not shown) in addition to motor generator 30, through coordinated operations of the engine and motor generator 30, vehicle driving power necessary for electric powered vehicle 100 is generated. Here, it is also possible to charge main battery 10 by using electric power generated by engine rotation.

Specifically, electric powered vehicle 100 represents a vehicle equipped with an electric motor for generating power for driving the vehicle, and includes a hybrid vehicle in which the vehicle driving power is generated by an engine and an electric motor, and an electric vehicle and a fuel cell vehicle not equipped with an engine.

The "power source system for an electric powered vehicle" is configured with the configuration of electric powered vehicle 100 shown in the figure, with motor generator 30, power transmission gear 40 and driving wheels 50 removed. In the following, the configuration of the power source system will be described in detail.

Power control unit (PCU) 20 includes a converter CNV, a smoothing capacitor C0, and inverter 26.

Converter CNV is configured to execute direct current (DC) voltage conversion between a DC voltage VL of a power supply line 153p and a DC voltage VH of a power supply line 154p.

Power supply line 153p and a ground line 153g are electrically connected to a positive electrode terminal and a negative electrode terminal of main battery 10 through system main relays SMR1 and SMR2, respectively. Smoothing capacitor C0 is connected to power supply line 154p to smooth the DC voltage. Similarly, a smoothing capacitor C1 is connected to power supply line 153p to smooth DC voltage VL.

Converter CNV is configured as a chopper circuit including power semiconductor switching elements (hereinafter also simply referred to as "switching elements") Q1 and Q2, a reactor L1, and smoothing capacitor C1, as shown in FIG. 1. Anti-parallel diodes are connected to switching elements Q1 and Q2, respectively, and therefore, converter CNV can execute bi-directional voltage conversion between power supply lines 153p and 154p. Alternatively, by fixing switching element Q1 as an upper arm element to ON and fixing switching element Q2 as a lower arm element to OFF, converter CNV can be operated to equalize the voltages of power supply lines 154p and 153p (VH=VL).

Inverter 26 is a general three-phase inverter, and therefore, a detailed circuit configuration thereof is not shown. By way of example, inverter 26 is configured such that upper and lower arm elements are arranged for each phase, and a node between the upper and lower arm elements of each phase is connected to a stator coil winding of a corresponding phase of motor generator 30.

When electric powered vehicle 100 is running, ON/OFF of each switching element of inverter 26 is controlled by MG-ECU 81, whereby the DC voltage of power supply line 154p is converted into a three-phase alternating current (AC) voltage and supplied to motor generator 30. Alternatively, at the time of regenerative braking of electric powered vehicle 100, ON/OFF of each switching element of inverter 26 is controlled by MG-ECU 81 such that an AC voltage from motor generator 30 is converted into a DC voltage and output to power supply line 154p.

Regarding control of motor generator 30, HV-ECU 80 and MG-ECU 81 are configured hierarchically. HV-ECU 80 sets an operation command value for driving motor generator 30 in accordance with a running state, and MG-ECU 81 controls PCU 20 to drive motor generator 30 in accordance with the operation command value from HV-ECU 80.

The power source system for electric powered vehicle 100 further includes, as a configuration of a low-voltage system (auxiliary system), a DC/DC converter 60, an auxiliary battery 70, a power supply line 155p, relays HVMR and PIMR, and an auxiliary load 90.

Auxiliary battery 70 is connected between power supply line 155p and a ground line. Auxiliary battery 70 corresponds to a "sub power storage device", and is configured with, for example, a lead battery. An output voltage Vs of auxiliary battery 70 corresponds to a power supply voltage of the low-voltage system. A rating of the power supply voltage is lower than the output voltage of main battery 10, and, for example, it is about 12V.

BAT-ECU 85 monitors the states of charge of main battery 10 and auxiliary battery 70. Generally, the state of charge of main battery 10 is managed using SOC (State Of Charge), which is the ratio (%) of a remaining capacity to the fully charged state set as 100%. In addition, the state of charge of auxiliary battery 70 is generally managed by output voltage Vs. The states of charge of main battery 10 and auxiliary battery 70 can be transmitted from BAT-ECU 85 to HV-ECU 80 and PLG-ECU 82. Further, BAT-ECU 85 controls operation/stop of DC/DC converter 60.

DC/DC converter 60 is configured to lower the output voltage of main battery 10 and convert it into a DC voltage Vi at the level of the output voltage of auxiliary battery 70. Rated output voltage Vi of DC/DC converter 60 is set such that auxiliary battery 70 can be charged. Therefore, when DC/DC converter 60 is operated by BAT-ECU 85, auxiliary battery 70 is charged using electric power of main battery 10 as necessary such that output voltage Vs of auxiliary battery 70 becomes constant.

DC/DC converter 60 is typically a switching regulator including a semiconductor switching element (not shown), and any known circuit configuration can be adopted. DC/DC converter 60 has an output side connected to power supply line 155p, and an input side electrically connected to the positive electrode terminal and the negative electrode terminal of main battery 10.

To power supply line 155p, auxiliary load 90 of the low-voltage system is connected. Auxiliary load 90 includes, for example, audio equipment, navigation equipment, and illumination devices (a hazard lamp, a room lamp, a head lamp, and the like). These auxiliary loads operate in accordance with a user operation, and thereby consume electric power.

Relay HVMR is electrically connected between power supply line 155p and HV-ECU 80. Relay PIMR is electrically connected between power supply line 155p and PLG-ECU 82. Although not shown, HV-ECU 80 and PLG-ECU 82 are configured such that a minimum circuit element required for activation processing always receives power supply from auxiliary battery 70 without through relays HVMR and PIMR, and a circuit element other than that receives power supply through relays HVMR and PIMR, reducing standby power consumption.

Further, the power source system for electric powered vehicle 100 includes, as an external charging system for external charging of main battery 10, a charging connector 105, a charger 110, and external charging relays CHR1 and CHR2. During operation, PLG-ECU 82 receives power supply from auxiliary battery 70 through relay PIMR. PLG-ECU 82 controls the devices constituting the external charging system.

Charging connector 105 is electrically connected to an external power source 400 as it is connected to a charging plug 410 of a charging cable connected to external power source 400. It is assumed that the charging cable contains a relay 405 for cutting off a charging path of external power source 400. Generally, external power source 400 is configured with a commercial AC power supply.

In place of the configuration shown in FIG. 1, a configuration in which external power source 400 and electric powered vehicle 100 are electromagnetically coupled in non-contact manner to supply electric power may be used. Specifically, a primary coil is provided on the side of the external power source, a secondary coil is provided on the side of the vehicle, and electric power may be supplied from external power source 400 to electric powered vehicle 100, utilizing mutual inductance between the primary and secondary coils. Even when such external charging is performed, the configuration following charger 110 for converting the electric power supplied from external power source 400 can be common.

A power supply line 151 electrically connects charging connector 105 and charger 110. Charger 110 converts an AC voltage from external power source 400 transmitted to power supply line 151 into a DC voltage for charging main battery 10. The converted DC voltage is output across a power supply line 152*p* and a ground line 152*g*. By feedback control of an output voltage and/or output current, charger 110 charges main battery 10 in accordance with a control command from PLG-ECU 82. The charge command is set in accordance with the state of main battery 10, for example, SOC and temperature.

External charging relay CHR1 is electrically connected between power supply line 152*p* and a positive electrode of main battery 10. External charging relay CHR2 is electrically connected between ground line 152*g* and a negative electrode of main battery 10.

Each of external charging relays CHR1 and CHR2, system main relays SMR1 and SMR2, and relays HVMR and PIMR is configured with an electromagnetic relay that is closed (ON) when an excitation current is supplied by an excitation circuit not shown, and opened (OFF) when the excitation current is not supplied. However, any circuit element can be used as each relay provided that it is a switch allowing control of conduction (ON)/non-conduction (OFF) of a conduction path.

HV-ECU 80 generates control commands SM1, SM2 for instructing ON of system main relays SMR1, SMR2. PLG-ECU 82 generates control commands SR1, SR2 for instructing ON of external charging relays CHR1, CHR2. In response to each of control commands SM1, SM2 and SR1, SR2, an excitation current for the corresponding system main relay or external charging relay is generated, using auxiliary battery 70 as a power source. When control command SM1, SM2, SR1, SR2 is not generated, the corresponding system main relay or external charging relay is maintained in an OFF (opened) state. ON/OFF of relays HVMR and PIMR is also controlled as appropriate in response to a key operation or an instruction for external charging by a driver, as described later.

In electric powered vehicle 100 in accordance with the present embodiment, a vehicle state is classified into three states, that is, a "vehicle running state", a "key-off state", and an "external charging state". Hereinafter, transition among these states will be described.

Figure 2:
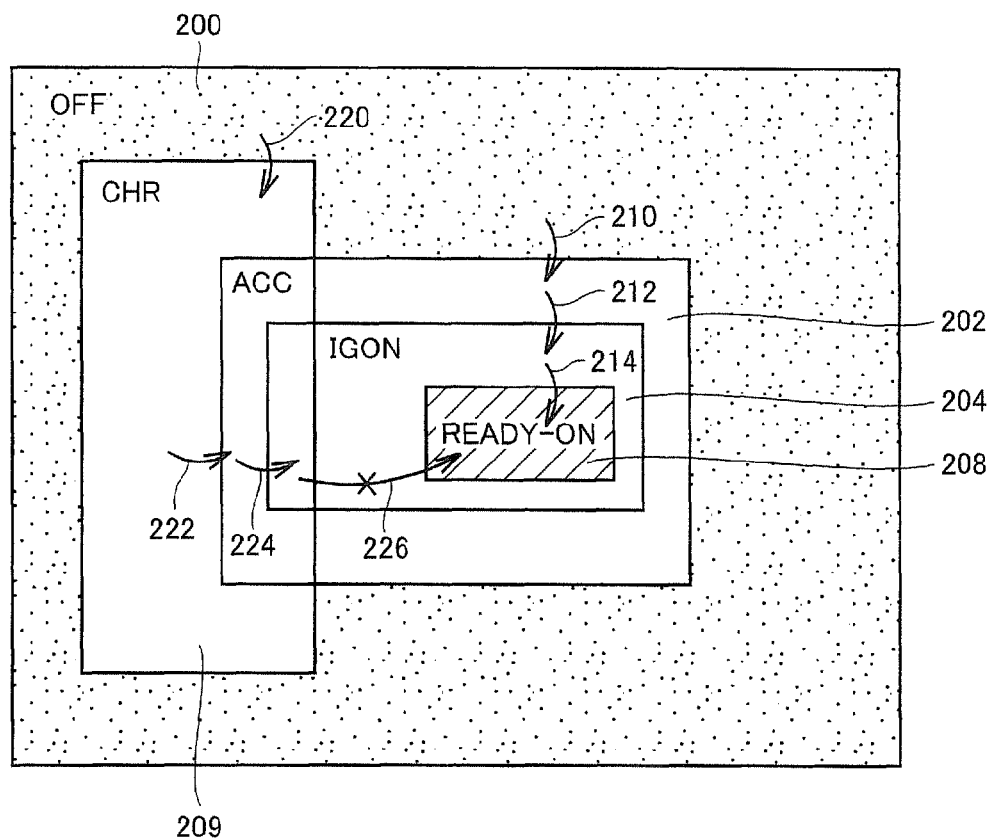
FIG. 2 is a transition diagram of a vehicle state in the electric powered vehicle shown in FIG. 1.

Referring to FIG. 2, a power source state of electric powered vehicle 100 includes an OFF state 200, an ACC (accessory) state 202, an IG-ON state 204, a READY-ON state 208, and a CHR state 209 set during external charging.

Transition among these power source states is mainly controlled in accordance with an operation of a power switch and a brake pedal not shown. Namely, the power source state transitions in response to a user operation.

OFF state 200 corresponds to a state where the power source system is OFF (i.e., a state where the vehicle is in the key-off state). In this power source state, power supply to each device mounted in the vehicle is basically cut off. However, power supply from auxiliary battery 70 to a minimum target, such as a part of the ECUs or an activation control portion of the ECUs, is continued. Further, generally, some devices including a part of illumination devices are configured to be operable by a user operation even in OFF state 200.

In ACC state 202, ACC is turned ON, and accessory devices such as audio equipment and an air conditioner receive power supply and become operable. In IG-ON state 204, IG is turned ON, and power is also supplied to devices required for vehicle running, in addition to power supply targets when the ACC is ON.

For example, whenever the power switch (not shown) is operated (pressed) without operating the brake pedal, the power source state transitions from OFF state 200 to ACC state 202 (an arrow 210), and from ACC state 202 to IG-ON state 204 (an arrow 212).

When the power switch is operated while operating the brake pedal, system check is activated. In the system check, if a prescribed running condition is satisfied, READY-ON state 208 is selected (an arrow 214). However, during external charging (CHR state 209), the above operation does not allow the power source state to transition to READY-ON state 208, as described later.

In READY-ON state 208, system main relays SMR1, SMR2 shown in FIG. 1 are turned ON, and motor generator 30 becomes operable by being controlled by PCU 20. Thereby, electric powered vehicle 100 is in a state where it can run in accordance with an operation of an accelerator pedal.

In OFF state 200, ACC state 202, or IG-ON state 204, it is also possible to turn ON ACC and IG and activate the system check by operating the power switch (not shown) while depressing the brake pedal. Further, when the power switch is operated in IG-ON state 204 or READY-ON state 208, the power source state transitions to OFF state 200.

Moreover, if a prescribed condition for starting charging is satisfied in OFF state 200, the power source state transitions to CHR state 209 as indicated by an arrow 220. The condition for starting charging includes a condition that charging plug 410 is normally connected to charging connector 105. The transition indicated by arrow 220 also occurs when an instruction to start charging is given manually or automatically in response to a user operation or by reaching a prescribed time point for starting charging.

It is also possible to select ACC state 202 or IG-ON state 204 by operating the power switch after the power source state once transitions to CHR state 209. Specifically, even during external charging, devices that are usable in ACC state 202 or IG-ON state 204 can be operated.

However, it is assumed that the prescribed running condition in the system check described above includes "not being in the external charging state (CHR state 209)", Accordingly, in CHR state 209, transition to READY-ON state 208 is prohibited, as indicated by an arrow 226. That is, it is impossible to select CHR state 209 and READY-ON state 208 simultaneously. In addition, transition to CHR state 209 is only possible from OFF state 200, and transitions from ACC state 202, IG-ON state 204, and READY-ON state 208 to CHR state 209 are prohibited.

CHR state 209 is terminated in response to satisfaction of a prescribed condition for terminating charging. For example, the condition for terminating charging can be determined based on a user operation, SOC of main battery 10, a time point, an elapsed charging time, or the like. If there occurs an abnormality in the connection of charging plug 410 to charging connector 105, external charging is forcibly suspended, and CHR state 209 is also terminated.

During external charging with ACC state 202 or IG-ON state 204 being selected, if CHR state 209 is terminated, the power source state transitions to ACC state 202 or IG-ON state 204. During external charging with ACC state 202 and IG-ON state 204 not being selected, if CHR state 209 is terminated, the power source state transitions to OFF state 200.

Thus, OFF state 200 corresponds to the "key-off state (running stop state)", and CHR state 209 corresponds to the "external charging state". Further, READY-ON state 208 corresponds to the "vehicle running state".

Referring to FIG. 1 again, operation of the power source system in each vehicle state of electric powered vehicle 100 will be described.

In the vehicle running state, relay HVMR is turned ON, and HV-ECU 80 and MG-ECU 81 are operated. BAT-ECU 85 is always operated in the vehicle running state to monitor the states of charge of auxiliary battery 70 and main battery 10. Further, BAT-ECU 85 always operates DC/DC converter 60. Therefore, in the vehicle running state, auxiliary battery 70 can be charged using the electric power of main battery 10 such that output voltage Vs of auxiliary battery 70 becomes constant in a situation where auxiliary load 90 is operated in accordance with a user operation.

Further, in the vehicle running state, system main relays SMR1, SMR2 are turned ON as described above, and thereby a vehicle running system is activated. Consequently, the output voltage of main battery 10 is transmitted, through system main relays SMR1 and SMR2 that are ON, to power supply line 153$p$ and ground line 153$g$. PCU 20 controls driving of motor generator 30 by power conversion between power supply line 153$p$ electrically connected to main battery 10 and motor generator 30. Namely, electric powered vehicle 100 can run using the electric power of main battery 10.

On the other hand, in the vehicle running state, the external charging system is stopped. Accordingly, external charging relays CHR1, CHR2 and relay PIMR are turned OFF, and charger 110 is also stopped. Further, relay PIMR controlling power supply from auxiliary battery 70 to PLG-ECU 82 is in an OFF state. Therefore, components of the external charging system can be designed considering only the operation of external charging.

In the external charging state, relay PIMR is turned ON, and PLG-ECU 82 is operated. Further, external charging relays CHR1, CHR2 are turned ON, and the external charging system is activated. Thereby, main battery 10 is charged using a DC voltage generated by converting AC power from external power source 400 by charger 110, through external charging relays CHR1, CHR2 that are ON.

Moreover, as in the vehicle running state, BAT-ECU 85 is always operated to monitor the states of charge of auxiliary battery 70 and main battery 10. Further, BAT-ECU 85 always operates DC/DC converter 60. Therefore, in the external charging state, auxiliary battery 70 can be charged using the electric power from external power source 400 such that output voltage Vs of auxiliary battery 70 becomes constant in a situation where auxiliary load 90 is operated in accordance with a user operation.

On the other hand, in the external charging state, the vehicle running system can be completely stopped by turning OFF relay HVMR and system main relays SMR1, SMR2. HV-ECU 80 and MG-ECU 81 can also be stopped. Further, power supply line 153$p$ and ground line 153$g$ are electrically separated from charger 110 and main battery 10 by system main relays SMR1, SMR2 that are OFF. Therefore, since the output voltage of main battery 10 is not applied to components of the vehicle running system, durabilities and lives of the components can be prevented from being changed due to the influence of external charging.

Specifically, in the configuration of FIG. 1, BAT-ECU 85 corresponds to a "first controller", PLG-ECU 82 corresponds to a "second controller", and HV-ECU 80 and MG-ECU 81 correspond to a "third controller".

In the key-off state (running stop state), system main relays SMR1, SMR2 are turned OFF, and relays HVMR, PIMR are also turned OFF. Namely, both the external charging system and the vehicle running system are stopped.

In order to start vehicle running from the key-off state (OFF state 200 in FIG. 2) in accordance with a user operation, it is necessary to activate each ECU operated using the electric power of auxiliary battery 70, and to activate the vehicle running system. Thus, if output voltage Vs of auxiliary battery 70 is reduced, there is a possibility that the vehicle running system cannot be activated, and the vehicle cannot run. In such a case, the vehicle cannot be activated even if the remaining capacity of main battery 10 is ensured.

Therefore, also in the key-off state where HV-ECU 80 and PLG-ECU 82 are stopped, it is necessary to operate BAT-ECU 85 to monitor at least the state of charge (output voltage Vs) of auxiliary battery 70. On the other hand, if electric powered vehicle 100 is left unused for a long time, there is a possibility that power consumption due to continuous operation of BAT-ECU 85 may reduce stored electric power (remaining capacity) of main battery 10 and auxiliary battery 70 as a whole.

Relay HVMR is OFF in the key-off state (OFF state 200) and ACC state 202, and is turned ON in response to transition to IG-ON state 204. Further, in ACC state 202 and IG-ON state 204, since the devices are highly likely to be operated using the electric power of auxiliary battery 70, it is preferable to always operate DC/DC converter 60 and BAT-ECU 85, as in the vehicle running state. Thereby, auxiliary battery 70 can be charged using the electric power of main battery 10 such that output voltage Vs of auxiliary battery 70 becomes constant.

In the power source system for the electric powered vehicle in accordance with the present embodiment, BAT-ECU 85 is intermittently operated in the key-off state, instead of being always operated. Specifically, BAT-ECU 85 is usually in a so-called sleep mode, and waits in a state where power consumption is suppressed, without performing usual control operation. BAT-ECU 85 is configured to be intermittently operated in response to an activation trigger, and thereby perform monitoring of the state of charge (output voltage Vs) of auxiliary battery 70 and charging control thereof.

Hereinafter, control operation in the key-off state of the power source system for the electric powered vehicle in accordance with the present embodiment will be described with reference to flowcharts of FIGS. 3 to 6. For example, a series of control processing illustrated in the flowchart of FIG. 3 is performed at prescribed intervals when electric powered vehicle 100 is in the key-off state.

Figure 3:
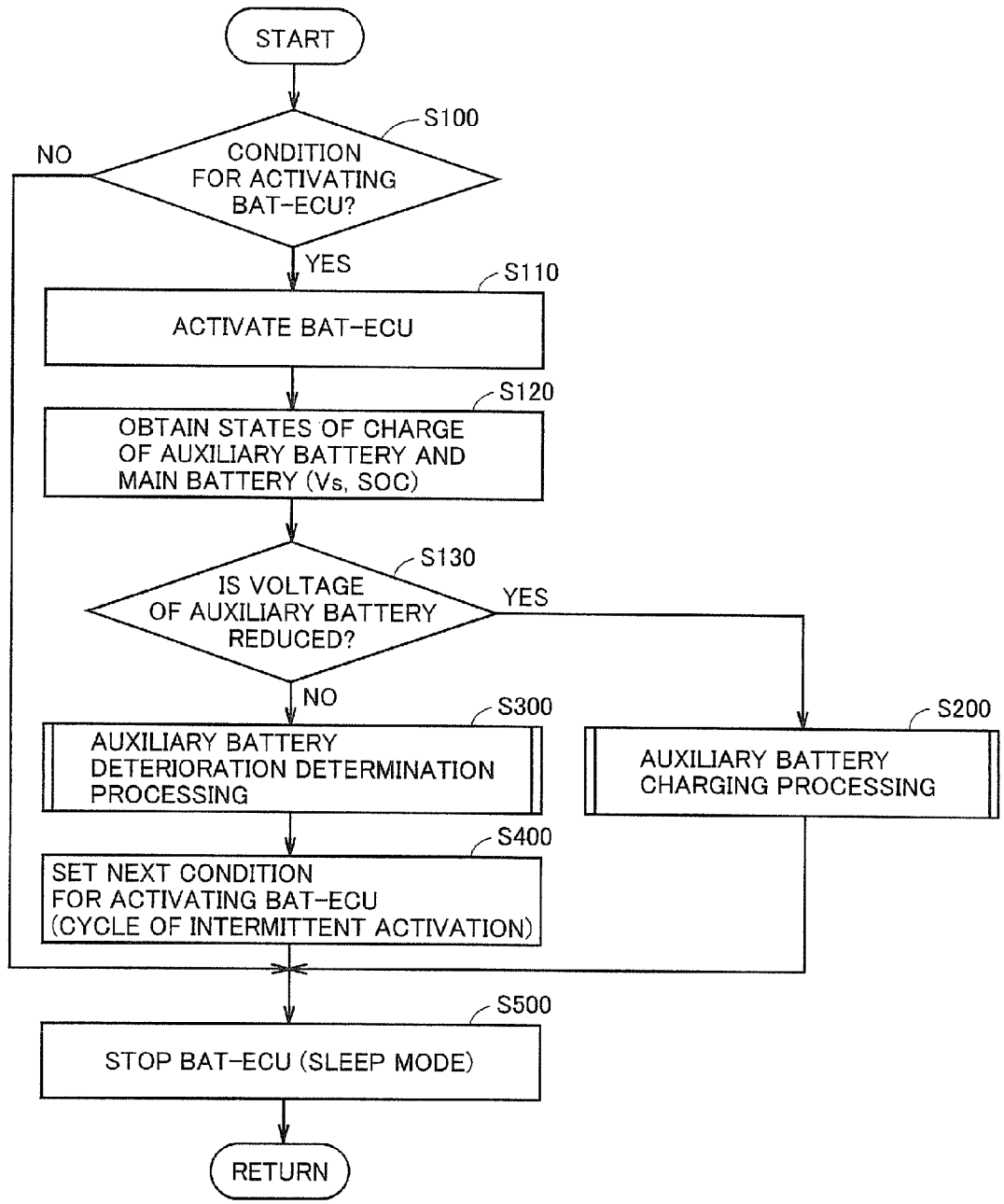
FIG. 3 is a flowchart illustrating control operation in a key-off state of the power source system for the electric powered vehicle in accordance with the embodiment of the present invention.

Referring to FIG. 3, in step S100, whether or not a condition for activating BAT-ECU 85 is satisfied is determined. The activation condition is satisfied, for example, when a predetermined time has elapsed since termination of previous operation of BAT-ECU 85. For example, if an activation trigger is generated in response to satisfaction of the activation condition, it is determined as YES in step S100 in response to generation of the activation trigger.

If the activation condition is not satisfied (NO in S100), the processing proceeds to step S500, and BAT-ECU 85 is maintained in a stop state (sleep mode).

If the activation condition is satisfied (YES in S100), the processing proceeds to step S110, and BAT-ECU 85 is activated. Thereby, BAT-ECU 85 is in a state where it can perform monitoring of the states of charge of auxiliary battery 70 and main battery 10 and control of operation/stop of DC/DC converter 60.

Then, in step S120, BAT-ECU 85 obtains the state of charge (output voltage Vs) of auxiliary battery 70 and the state of charge (SOC) of main battery 10. Further, BAT-ECU 85 advances the processing to step S130 to determine whether or not the remaining capacity of auxiliary battery 70 is reduced. Typically, determination in step S130 is performed based on whether or not output voltage Vs of auxiliary battery 70 becomes lower than a prescribed reference voltage. The reference voltage is determined to have an appropriate margin for a lower limit voltage at which the devices such as the ECUs can be operated normally.

If output voltage Vs of the auxiliary battery becomes lower than the reference voltage (YES in S130), BAT-ECU 85 performs processing for charging auxiliary battery 70 in step S200. On the other hand, if output voltage Vs of the auxiliary battery is not less than the reference voltage (NO in S130), BAT-ECU 85 advances the processing to step S300 to perform processing for determining whether auxiliary battery 70 is deteriorated. Further, in step S400, BAT-ECU 85 sets a next activation condition based on the deterioration processing determination in step S300.

If the auxiliary battery charging processing (S200) or the auxiliary battery deterioration determination processing (S300, S400) is terminated, BAT-ECU 85 enters the stop state (sleep mode) again in step S500, and thus a series of processing at the time of intermittent operation is terminated.

Until the next activation condition is satisfied, determination in step S100 is maintained at NO, and BAT-ECU 85 is maintained in the stop state. On the other hand, if the activation condition is satisfied, it is determined as YES in step S100 and the processing in and after step S110 is performed, and thereby BAT-ECU 85 is intermittently operated.

Figure 4:
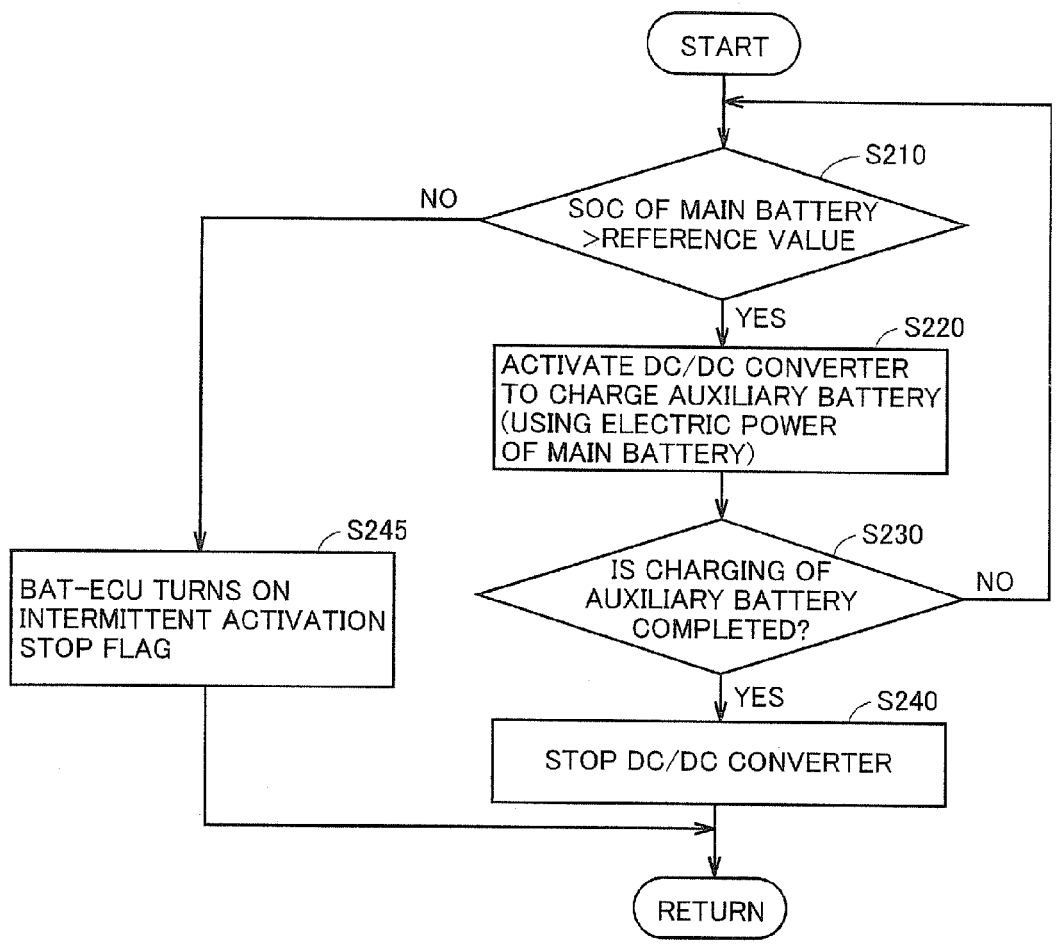
FIG. 4 is a flowchart showing a first example of a detailed processing procedure of auxiliary battery charging processing shown in FIG. 3.

FIG. 4 is a flowchart showing a detailed processing procedure of the auxiliary battery charging processing shown in FIG. 3.

Referring to FIG. 4, BAT-ECU 85 determines in step S210 whether or not SOC of main battery 10 is higher than a prescribed reference value. The reference value in step S210 is used to determine whether or not main battery 10 has a margin to charge auxiliary battery 70. Therefore, the reference value is set such that it is determined as NO in step S210 in a low SOC region where charging of auxiliary battery 70 would make it difficult for the vehicle to run using the electric power of main battery 10, or in a low SOC region where main battery 10 would cause deterioration.

If main battery 10 has a margin (YES in S210), BAT-ECU 85 advances the processing to step S220 to activate DC/DC converter 60. Thereby, auxiliary battery 70 is charged using the electric power of main battery 10.

Further, during the charging of auxiliary battery 70 by DC/DC converter 60, BAT-ECU 85 sequentially determines in step S230 whether or not the charging of auxiliary battery 70 is completed. Determination in step S230 is performed based on, for example, output voltage Vs of auxiliary battery 70.

Until the charging of auxiliary battery 70 is completed (while it is determined as NO in S230), operations in step S210 and S220 are repeatedly performed. Then, when output voltage Vs of auxiliary battery 70 is increased, BAT-ECU 85 determines that the charging of auxiliary battery 70 is completed (YES in S230), and stops DC/DC converter 60 in step S240. Thereby, the charging of auxiliary battery 70 is terminated.

On the other hand, if the main battery has no margin to charge auxiliary battery 70 (NO in S210), BAT-ECU 85 skips step S220 and advances the processing to step S245. Thereby, DC/DC converter 60 is stopped, and charging of auxiliary battery 70 by main battery 10 is not performed. It is to be noted that, also when SOC of main battery 10 becomes lower than the reference value during charging of auxiliary battery 70 once started, that is, when it is determined as NO in S210 while the processing in S210 and S220 is repeated, DC/DC converter 60 is stopped by similar processing, and the charging of auxiliary battery 70 is forcibly terminated.

Further, in step S245, BAT-ECU 85 turns on an intermittent activation stop flag. When the flag is on, it is forcibly determined as NO in step S100 in FIG. 3.

Thereby, step S500 is performed whenever the flowchart of FIG. 3 is activated, and thus BAT-ECU 85 is maintained in the stop state (sleep mode) during the key-off state.

Figure 5:
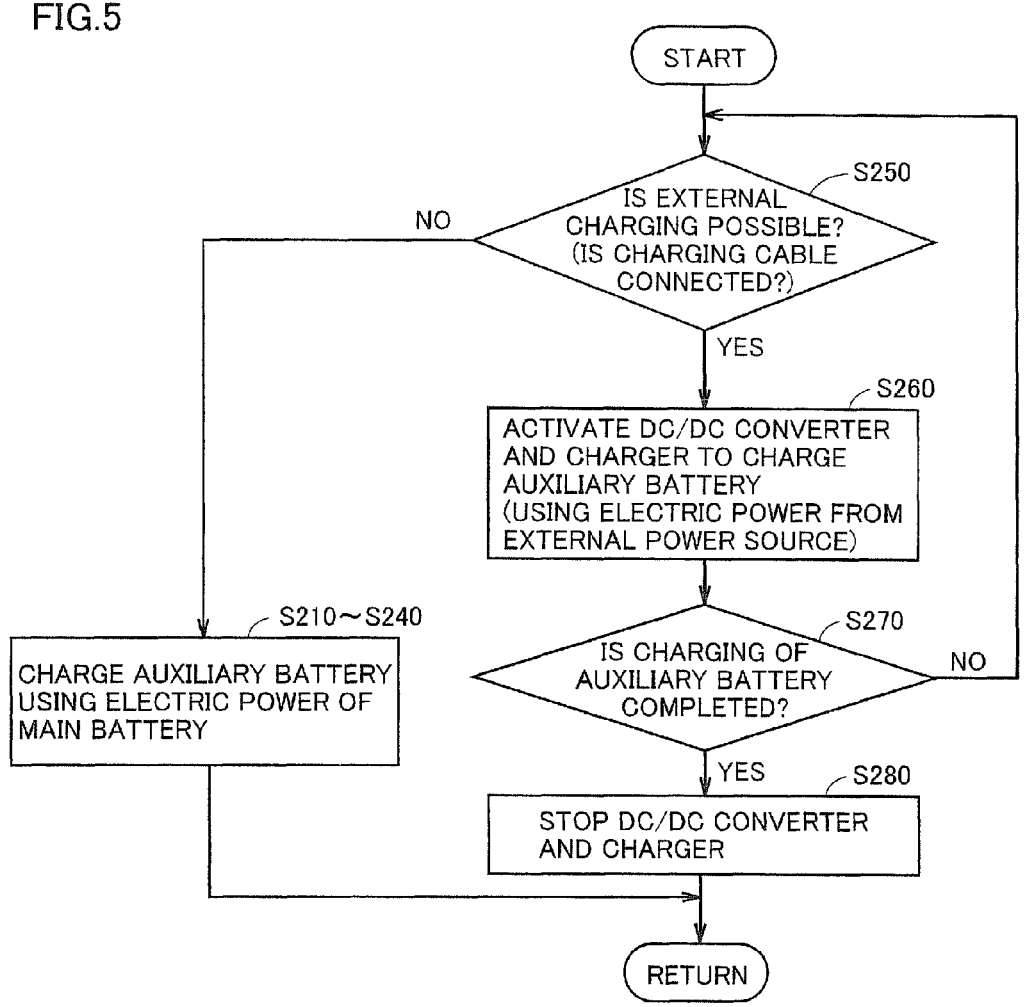
FIG. 5 is a flowchart showing a second example of the detailed processing procedure of the auxiliary battery charging processing shown in FIG. 3.

Alternatively, in an electric powered vehicle that is externally chargeable as shown in FIG. 1, the auxiliary battery charging processing (S200) shown in FIG. 3 may be configured as shown in FIG. 5.

Referring to FIG. 5, when the auxiliary battery charging processing (S200) is started, BAT-ECU 85 firstly determines in step S250 whether or not external charging is possible.

For example, if CHR state 209 is terminated with the connection of charging plug 410 being maintained after completion of charging of main battery 10 by external power source 400, it is determined that "external charging is possible (YES in S250)", because it is possible to receive power supply from external power source 400.

Further, in the configuration in which external power source 400 and electric powered vehicle 100 are electromagnetically coupled to supply electric power in non-contact manner, whether or not external charging is possible is determined based on whether or not the primary coil on the side of the external power source and the secondary coil on the side of the vehicle have positional relationship that allows power supply and reception by electromagnetic coupling.

If external charging is possible (YES in S250), BAT-ECU 85 advances the processing to step S260 to instruct activation of DC/DC converter 60 and generate a request to activate the external charging system. Thereby, auxiliary battery 70 can be charged by converting the electric power supplied from external power source 400 by charger 110 and DC/DC converter 60.

During the charging of auxiliary battery 70 in step S260, BAT-ECU 85 determines in step S270 whether or not the charging of auxiliary battery 70 is completed. Determination in step S270 is identical to the determination in step S230 in FIG. 4.

When the charging of auxiliary battery 70 is completed (YES in S270), BAT-ECU 85 advances the processing to step S280 to stop DC/DC converter 60 and generate a request to stop the external charging system. Thereby, the charging of auxiliary battery 70 is terminated, and the external charging system is stopped again.

On the other hand, if external charging is impossible (NO in S250), BAT-ECU 85 performs processing for charging auxiliary battery 70 using the electric power of main battery 10 in accordance with the processing in steps S210 to S240 shown in FIG. 4.

Next, the auxiliary battery deterioration determination processing (S300) shown in FIG. 3 will be described with reference to FIG. 6.

Figure 6:
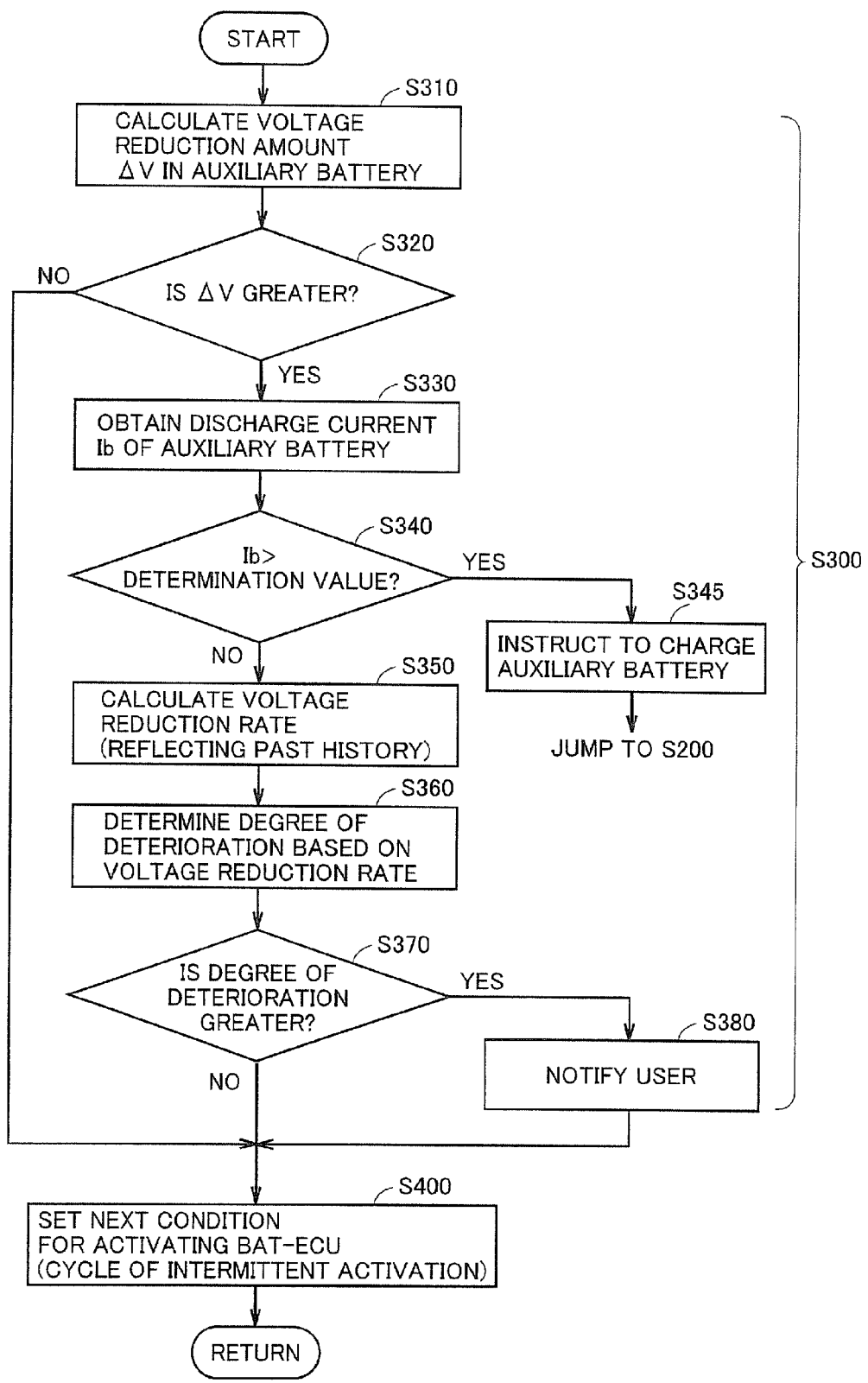
FIG. 6 is a flowchart showing a detailed processing procedure of auxiliary battery deterioration determination processing shown in FIG. 3.

Referring to FIG. 6, when the auxiliary battery deterioration determination processing is started, BAT-ECU 85 calculates in step S310 a voltage reduction amount $\Delta V$ in auxiliary battery 70 based on changes in output voltage Vs of auxiliary battery 70 obtained at each intermittent operation. Preferably, voltage reduction amount $\Delta V$ is calculated using exclusion and filtering of abnormal values.

BAT-ECU 85 determines in step S320 whether or not the calculated voltage reduction amount $\Delta V$ is greater than a prescribed level. If voltage reduction amount $\Delta V$ is greater (YES in S320), BAT-ECU 85 advances the processing to step S330 to obtain a present discharge current Ib of auxiliary battery 70. Discharge current Ib can be obtained by a current sensor not shown provided to auxiliary battery 70.

Further, BAT-ECU 85 determines in step S340 whether or not discharge current Ib is greater than a prescribed determination value. If discharge current Ib of auxiliary battery 70 is greater (YES in step S340), which means that the remaining capacity of auxiliary battery 70 is rapidly reduced due to operation of auxiliary load 90 (for example, a head light and the like), BAT-ECU 85 instructs in step S345 to perform processing for charging auxiliary battery 70. Thereby, the processing jumps to step S200 in FIG. 3.

On the other hand, if discharge current Ib is not more than the determination value (NO in S340), BAT-ECU 85 calculates in step S350 a voltage reduction rate, which is an inclination of voltage reduction to elapsed time, based on changes in output voltage Vs of auxiliary battery 70 obtained at each intermittent operation. The voltage reduction rate is determined based on, for example, history of reduction of output voltage Vs within a certain preceding time period.

Then, BAT-ECU 85 determines in step S360 a degree of deterioration of auxiliary battery 70 based on the calculated voltage reduction rate. For example, a deterioration parameter value which quantifies a degree of deterioration is calculated. This determination is based on the characteristic that the rate of reduction of output voltage Vs to continuous consumption of a dark current at the same level is increased as deterioration of auxiliary battery 70 progresses. Namely, as the voltage reduction rate becomes greater, the degree of deterioration is determined as being greater, and a greater deterioration parameter value is calculated.

Further, BAT-ECU 85 determines in step S370 whether or not the degree of deterioration (deterioration parameter value) determined in step S360 is greater than a prescribed level. If the degree of deterioration is greater than the prescribed level (YES in S370), BAT-ECU 85 notifies a user that auxiliary battery 70 has a great degree of deterioration in step S380. This notification to the user is output, for example, as a warning message urging the user to perform maintenance and inspection of auxiliary battery 70. On the other hand, if the degree of deterioration is not greater than the prescribed level (NO in S370), BAT-ECU 85 does not perform the notification to the user in step S380.

If voltage reduction amount ΔV calculated in S310 is not greater than the prescribed level (NO in S320), BAT-ECU 85 skips the processing in S330 to S380 and advances the processing to step S400.

Further, upon termination of the auxiliary battery deterioration determination processing in step S300, BAT-ECU 85 sets a next condition for activating BAT-ECU 85 in step S400.

Typically, the activation condition indicates a cycle Tc of intermittent activation. For example, if voltage reduction amount ΔV is not greater than the prescribed level (NO in S320), cycle Tc is set to a prescribed default value, and if voltage reduction amount ΔV is greater than the prescribed level (YES in S320), cycle Tc is set to be shorter than the default value. On this occasion, it is preferable to set cycle Tc to be shorter as the degree of deterioration (deterioration parameter value) determined in step S360 becomes greater.

As described above, according to the power source system for the electric powered vehicle in accordance with the embodiment of the present invention, monitoring and charging control of auxiliary battery 70 can be performed while suppressing power consumption by auxiliary battery 70, by intermittently operating the ECU (BAT-ECU 85) in the key-off state (running stop state) corresponding to a so-called ignition switch off state. This can more reliably prevent reduction of the output voltage of auxiliary battery 70 while running of the electric powered vehicle is stopped, and can ensure normal vehicle activation performance even after running thereof is stopped for a long time.

In addition, in the processing for charging auxiliary battery 70 having a reduced output voltage (S200), auxiliary battery 70 is charged after checking the margin of SOC of main battery 10, which can avoid overdischarge of main battery 10 as a result of supplying charging power for auxiliary battery 70. Further, in the externally chargeable electric powered vehicle, electric power stored in the entire vehicle in the key-off state can be ensured by preferentially using the electric power of the external power source to charge auxiliary battery 70 (FIG. 4). Moreover, when there is no means for charging auxiliary battery 70, intermittent activation of BAT-ECU 85 is suspended and BAT-ECU 85 is maintained in the stop state, which can avoid electric power from being consumed uselessly for monitoring and charging control of auxiliary battery 70.

Further, even when charging of auxiliary battery 70 is not necessary, the degree of deterioration of auxiliary battery 70 can be determined based on output voltage Vs of auxiliary battery 70 monitored by the intermittent operation. Furthermore, by setting the cycle of the intermittent operation of BAT-ECU 85 to be variable, power consumption can be reduced while maintaining the effect of monitoring auxiliary battery 70.

It is to be noted that the auxiliary battery deterioration determination processing (S300) in the processing of FIG. 3 can be omitted.

Further, in the configuration shown in FIG. 1, the components (in particular, BAT-ECU 85) related to main battery 10, auxiliary battery 70, and DC/DC converter 60, which are required to be operated even in the key-off state, are separated from the external charging system and the vehicle running system, and used in common in the respective running states. As a result, there is no need to arrange the components redundantly, and thus cost reduction can be achieved.

Modifications

FIG. 1 illustrates a so-called plug-in type electric powered vehicle in which a vehicle-mounted power storage device can be charged by an external power source. However, the invention of the present application is not limited to a plug-in type electric powered vehicle, but is also applicable to an electric powered vehicle not having an external charging system.

In the following modifications, configurations of a power source system applied to such an electric powered vehicle will be described.

Figure 7:
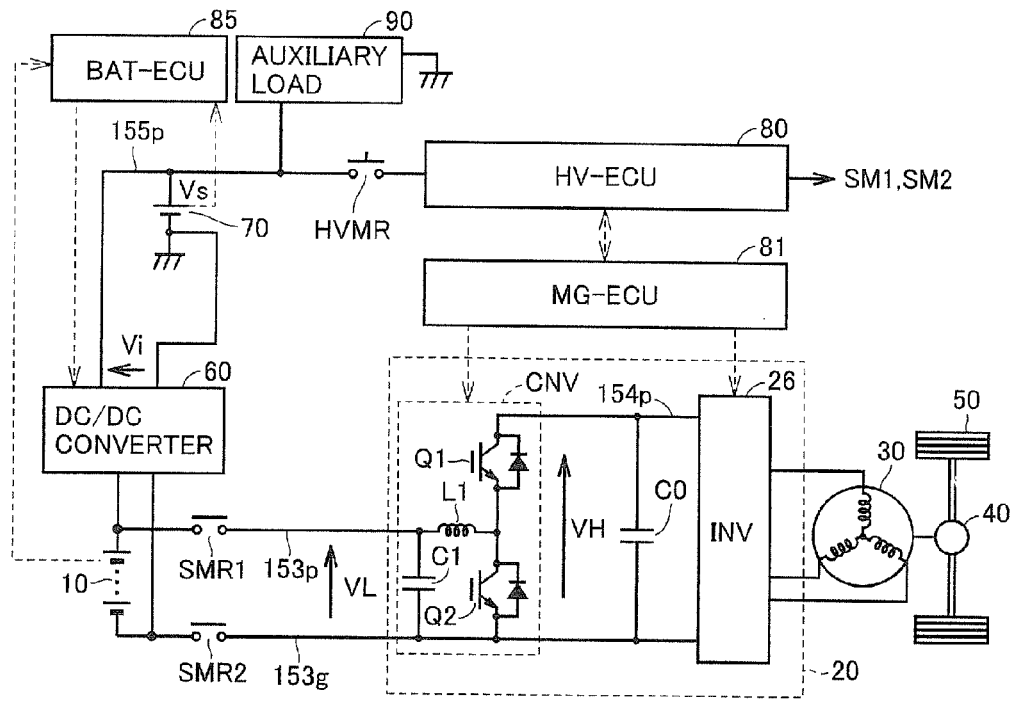
FIG. 7 is a block diagram showing a configuration of a power source system for an electric powered vehicle in accordance with a first modification of the embodiment of the present invention.

FIG. 7 is a block diagram showing a configuration of a power source system for an electric powered vehicle in accordance with a first modification of the embodiment of the present invention.

Referring to FIG. 7, in the first modification, the external charging system is removed from the configuration of the power source system for the electric powered vehicle shown in FIG. 1. In addition, in the power source system for the electric powered vehicle shown in FIG. 7, CHR state 209 is removed from the power source state shown in FIG. 2.

In the vehicle running state, BAT-ECU 85 is always operated, and in the key-off state (OFF state 200), BAT-ECU 85 is intermittently operated in accordance with the flowchart shown in FIG. 3, and can perform charging control of auxiliary battery 70. However, the auxiliary battery charging processing in step S200 in FIG. 3 can be performed by the processing in steps S210 to S245 shown in FIG. 4. Namely, in the configuration in FIG. 7, HV-ECU 80 constitutes a "first controller".

Figure 8:
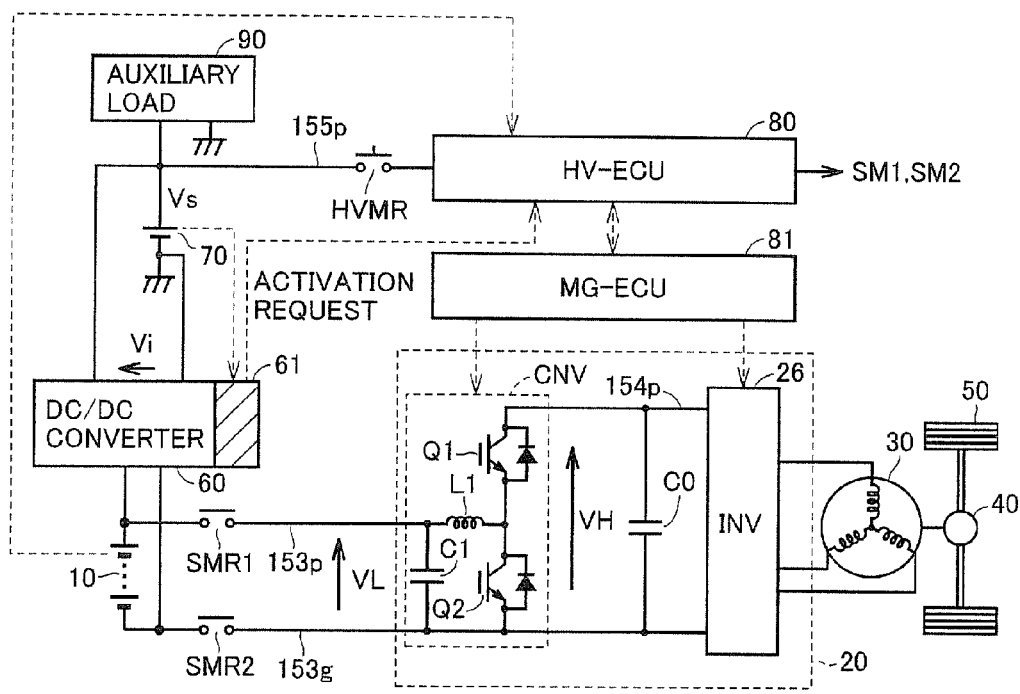
FIG. 8 is a block diagram showing a configuration of a power source system for an electric powered vehicle in accordance with a second modification of the embodiment of the present invention.

Alternatively, also with a configuration not having BAT-ECU 85 as shown in FIG. 8, the same effect can be obtained in the power source system for the electric powered vehicle not having an external charging system.

When FIG. 8 is compared with FIG. 7, BAT-ECU 85 is not arranged in a second modification shown in FIG. 8. In addition, a control circuit 61 of DC/DC converter 60 has a function of monitoring output voltage Vs of auxiliary battery 70.

Further, control circuit 61 of DC/DC converter 60 is configured to be able to communicate with HV-ECU 80. Specifically, HV-ECU 80 can instruct control circuit 61 to operate/stop DC/DC converter 60. Moreover, since HV-ECU 80 can monitor output voltage Vs of auxiliary battery 70 and SOC of main battery 10, it has a function of performing monitoring and charging control of main battery 10 and auxiliary battery 70 as with BAT-ECU 85.

In the power source system for the electric powered vehicle shown in FIG. 8, when the electric powered vehicle is in the key-off state, HV-ECU 80 is basically in the stop state, and control circuit 61 is intermittently operated as with BAT-ECU 85 in FIGS. 1 and 7. Control circuit 61 is configured to monitor output voltage Vs of auxiliary battery 70 whenever it is intermittently operated, and generate a request to activate HV-ECU 80 if it detects reduction of output voltage Vs.

HV-ECU 80 operated in response to the activation request checks SOC of main battery 10 and then operates DC/DC converter 60, as with BAT-ECU 85 in FIGS. 1 and 7. Thereby, HV-ECU 80 can implement processing identical to the auxiliary battery charging processing in FIG. 4. Namely, in the configuration in FIG. 8, HV-ECU 80 and control circuit 61 constitute a "first controller".

As described above, also in the electric powered vehicle not having an external charging system as shown in FIGS. 7 and 8, monitoring and charging control of auxiliary battery 70 through intermittent operation of the ECU can be performed in the key-off state (running stop state).

Further, also in the configuration in FIG. 1, it is possible to generate a request to activate BAT-ECU 85 by control circuit 61 of DC/DC converter 60, based on output voltage Vs of auxiliary battery 70. In this case, BAT-ECU 85 is intermittently operated based on output voltage Vs instead of an operation interval (time). However, in this case, in the processing in FIG. 3, the auxiliary battery deterioration determination processing (S300) is omitted, and only the auxiliary battery charging processing (S200) is performed.

It is to be noted that, in the present embodiment and the modifications thereof, the configuration following power supply line 153p (on the side of the load) is not limited to the configurations shown in the figures. For example, PCU 20 can also be configured such that converter CNV is omitted and the output voltage of main battery 10 is directly used as a DC side voltage of inverter 26. Further, the load of the power source system can have any configuration including a configuration generating vehicle driving power. That is, the present invention is applicable in common to an electric powered vehicle equipped with a power storage device that is externally chargeable and an electric motor for generating power for driving wheels that is configured to be able to be driven using electric power of the power storage device, including an electric vehicle and a fuel cell vehicle not equipped with an engine, and a hybrid vehicle equipped with an engine.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The present invention is applicable to an electric powered vehicle equipped with a main power storage device (main battery) for supplying electric power to a traction motor and a sub power storage device (auxiliary battery) for supplying electric power to auxiliary machines including a controller.

REFERENCE SIGNS LIST

10: main battery, 26: inverter, 30: motor generator, 40: power transmission gear, 50: driving wheels, 60: DC/DC converter, 61: control circuit, 70: auxiliary battery, 90: auxiliary load, 100: electric powered vehicle, 105: charging connector, 110: charger, 152g, 153g: ground line, 151, 152p, 153p, 154p, 155p: power supply line, 200, 202, 204, 208, 209: power source state, 400: external power source, 405: relay, 410: charging plug, C0, C1: smoothing capacitor, CHR1, CHR2: external charging relay, CNV: converter, HVMR, PIMR: relay (for supplying electric power to the ECUs), L1: reactor, Q1, Q2: power semiconductor switching element, SM1, SM2, SR1, SR2: control command (relay), SMR1, SMR2: system main relay, VH, VL: DC voltage, Vi: DC voltage (DC/DC converter), Vs: output voltage (auxiliary battery).

The invention claimed is:

1. A power source system for an electric powered vehicle equipped with a motor generating vehicle driving power, comprising:
    a main power storage device for storing electric power input to and output from said motor;
    a sub power storage device having an output voltage lower than an output voltage of said main power storage device;
    a voltage converter configured to convert the output voltage of said main power storage device to a level of the output voltage of said sub power storage device, and output the converted output voltage to said sub power storage device; and
    a first controller operated using electric power from said sub power storage device, for monitoring states of charge of said main power storage device and said sub power storage device and controlling operation and stop of said voltage converter,
    said first controller being configured such that, in a vehicle running state, said first controller is always operated, and always operates said voltage converter to maintain the output voltage of said sub power storage device at a target voltage, and when said electric powered vehicle is in a key-off state, said first controller is intermittently operated, and if the output voltage of said sub power storage device becomes lower than a prescribed voltage during operation, said first controller performs charging processing for said sub power storage device using the electric power of said main power storage device, by operating said voltage converter.

2. The power source system for an electric powered vehicle according to claim 1, further comprising:
    a charging connector for establishing electrical contact with an external power source external to the vehicle;
    a charger for converting electric power from said external power source supplied to said charging connector, into charging power for said main power storage device; and a second controller operated using the electric power supplied from said sub power storage device, for controlling said charger to charge said main power storage device using the electric power from said external power source when a prescribed condition for external charging is satisfied and thereby transition from said key-off state to an external charging state is made, wherein, in said external charging state, said first controller is always operated, and always operates said voltage converter to maintain the output voltage of said sub power storage device at said target voltage.

3. The power source system for an electric powered vehicle according to claim 2, wherein said first controller is configured such that, if the electric power from said external power source can be supplied when the output voltage of said sub power storage device becomes lower than said prescribed voltage during intermittent operation in said key-off state, said first controller performs the charging processing for said sub power storage device using the electric power from said external power source, by operating said voltage converter and requesting operation of said second controller and said charger.

4. The power source system for an electric powered vehicle according to claim 3, wherein said first controller is configured such that, if the electric power from said external power source cannot be supplied when the output voltage of said sub power storage device becomes lower than said prescribed voltage during the intermittent operation in said key-off state, said first controller performs the charging processing for said sub power storage device using the electric power of said main power storage device, by operating said voltage converter.

5. The power source system for an electric powered vehicle according to claim 1, further comprising an auxiliary load configured to receive supply of operational electric power from said sub power storage device, wherein said first controller is configured such that, if a voltage reduction amount in said sub power storage device and a discharge current of said sub power storage device are greater than prescribed levels even when the output voltage of said sub power storage device is higher than said prescribed voltage during intermittent operation in said key-off state, said first controller performs the charging processing for said sub power storage device using electric power from an external power source or the electric power of said main power storage device.

6. The power source system for an electric powered vehicle according to claim 1, wherein said first controller is configured such that, if a remaining capacity of said main power storage device is lower than a prescribed level during the charging processing for said sub power storage device, said first controller does not perform said charging processing using the electric power of said main power storage device.

7. The power source system for an electric powered vehicle according to claim 6, wherein said first controller is configured such that, if the remaining capacity of said main power storage device is lower than said prescribed level and thus said first controller does not perform said charging processing, said first controller suspends subsequent intermittent operation and keeps stopping during said key-off state.

8. The power source system for an electric powered vehicle according to claim 1, wherein said first controller is configured such that, if the output voltage of said sub power storage device is higher than said prescribed voltage during intermittent operation in said key-off state, said first controller determines a degree of deterioration of said sub power storage device based on changes in said output voltage detected at each said intermittent operation.

9. The power source system for an electric powered vehicle according to claim 8, wherein said first controller is configured such that, during the intermittent operation in said key-off state, said first controller sets a cycle of the intermittent operation based on the determined degree of deterioration of said sub power storage device.

10. The power source system for an electric powered vehicle according to claim 1, further comprising:
a charging connector for establishing electrical contact with an external power source external to the vehicle;
a charger for converting electric power from said external power source supplied to said charging connector, into charging power for said main power storage device;
a charging relay for controlling connection and cut-off between said charger and said main power storage device;
a second controller operated using the electric power from said sub power storage device, for controlling said charger to charge said main power storage device by said external power source when a prescribed condition for external charging is satisfied and thereby transition from said key-off state to an external charging state is made;
a main relay controlling connection and cut-off between said main power storage device and a main power supply line;
a power control unit configured to control driving of said motor by power conversion between said main power supply line and said motor during said vehicle running state; and
a third controller operated using the electric power from said sub power storage device, for controlling said power control unit to drive said motor in accordance with a running state during said vehicle running state,
wherein, in said key-off state, said main relay and said charging relay are opened, and said second controller, said third controller, said charger, and said power control unit are stopped.

11. A control method for a power source system for an electric powered vehicle equipped with a motor generating vehicle driving power,
said power source system including:
a main power storage device for storing electric power input to and output from said motor;
a sub power storage device having an output voltage lower than an output voltage of said main power storage device;
a voltage converter configured to convert the output voltage of said main power storage device to a level of the output voltage of said sub power storage device and output the converted output voltage to said sub power storage device; and
a first controller operated using electric power from said sub power storage device, for monitoring states of charge of said main power storage device and said sub power storage device and controlling operation and stop of said voltage converter,
said control method comprising the steps of:
intermittently operating said first controller when said electric powered vehicle is in a key-off state;
obtaining the output voltage of said sub power storage device during intermittent operation of said first controller; and
performing, if obtained said output voltage becomes lower than a prescribed voltage, charging processing for said sub power storage device using the electric power of said main power storage device, by operating said voltage converter.

12. The control method for a power source system for an electric powered vehicle according to claim 11, wherein said power source system further includes:
a charging connector for establishing electrical contact with an external power source external to the vehicle;
a charger for converting electric power from said external power source supplied to said charging connector, into charging power for said main power storage device; and
a second controller operated using the electric power supplied from said sub power storage device, for controlling said charger to charge said main power storage device by said external power source when a prescribed condition for external charging is satisfied and thereby transition from said key-off state to an external charging state is made, and the step of performing said charging processing further includes the steps of:
determining whether or not the electric power from said external power source can be supplied;
performing, if the electric power from said external power source can be supplied, the charging processing for said sub power storage device using the electric power from said external power source, by operating said voltage converter and requesting operation of said second controller and said charger; and
performing, if the electric power from said external power source cannot be supplied, the charging processing for said sub power storage device using the electric power of said main power storage device, by operating said voltage converter.

13. The control method for a power source system for an electric powered vehicle according to claim 11, wherein said power source system further includes an auxiliary load configured to receive supply of operational electric power from said sub power storage device, and said control method further comprises the step of instructing the charging processing for said sub power storage device, if a voltage reduction amount in said sub power storage device and a discharge current of said sub power storage device are greater than prescribed levels even when obtained said output voltage is higher than said prescribed voltage.

14. The control method for a power source system for an electric powered vehicle according to claim 11, wherein said step of performing said charging processing has the step of not performing said charging processing using the electric power of said main power storage device, if a remaining capacity of said main power storage device is lower than a prescribed level.

15. The control method for a power source system for an electric powered vehicle according to claim 14, wherein said step of performing said charging processing further includes the step of suspending subsequent intermittent operation of said first controller and keeping stopping of said first controller during said key-off state, if the remaining capacity of said main power storage device is lower than said prescribed level and thus said charging processing is not performed.

16. The control method for a power source system for an electric powered vehicle according to claim 11, further comprising the step of determining a degree of deterioration of said sub power storage device based on changes in the output voltage of said sub power storage device detected at each said intermittent operation, if obtained said output voltage is higher than said prescribed voltage.

17. The control method for a power source system for an electric powered vehicle according to claim 16, further comprising the step of setting a cycle of the intermittent operation of said first controller based on the determined degree of deterioration of said sub power storage device.

* * * * *